United States Patent Office 3,203,760
Patented Aug. 31, 1965

3,203,760
PROCESS FOR PREPARING SILICA GEL
Milton E. Winyall, Gainesville, Fla., assignor to W. R. Grace & Co., a corporation of Connecticut
No Drawing. Filed Dec. 17, 1962, Ser. No. 244,940
The portion of the term of the patent subsequent to Dec. 25, 1979, has been disclaimed
2 Claims. (Cl. 23—182)

This application is a continuation-in-part of Serial No. 832,890, filed August 11, 1959, now U.S. Patent 3,070,426.

The invention relates to a fine sized silica product having a low surface area. More particularly, the invention relates to silicas having a surface area between about 10 and 250 m.$^2$/g.

It is known that most solids are capable of adsorbing gas, vapors or liquids on their surfaces to some degree and that the amount adsorbed depends on the nature and extent of the surface. For example, commercial silica gel contains an extensive lattice of void spaces which permits adsorption of approximately 50% of its weight from saturated air. From this, it has been estimated that one cubic inch of silica gel contains pores having a surface of about 50,00 square feet. With this enormous internal surface and infinite number of small diameter capillaries, silica gel attracts vapors, condenses them, and holds them as liquids. The same phenomenon applies to the adsorption of liquids per se.

The silica prepared according to this invention has the same chemical composition as silica gel and differs physically from the highly porous gel. While the gel is characterized by a high surface area, i.e., of the order of 300 to 1000 m.$^2$/g., the silica of this invention possesses a surface area below 250 m.$^2$/g., and generally between 10 and 250 m.$^2$/g. Consequently, this silica lacks the characteristic adsorptive properties of silica gel. The absence of appreciable adsorptivity renders the the silica of this invention suitable for such uses as a filler, for example, in asphalt or vinyl type tiles. In addition, the silica is colorless, and for this reason it finds particular applicability as a filler in pastel vinyls which, while providing the cost-reducing bulk, does not affect the chromaticity of the final product.

In the parent case, a process for preparing finely divided colorless silica having a low surface area was described. The process comprised forming an aqueous solution of a suitable silicate, preferably on alkali metal silicate, spray drying the silicate solution, acidifying the dried silicate particles with agitation and thereafter purifying the same. The parent application described products having a surface area of about 10 to about 100 m.$^2$/g., preferably about 10 to 50 m.$^2$/g.

This application covers the product recovered from the process of the parent case and the product recovered from variations of this process, which are new products having a surface area of up to about 250 m.$^2$/g.

In carrying out the processes, a silicate solution is prepared, for example, by dissolving a soluble silicate such as an alkali metal silicate in water. Although any of the alkali metal silicates may be used, such as sodium silicate, potassium silicate, etc., sodium silicate is preferred because of its favorable economic position. For the purpose of simplicity, therefore, the invention will be described by reference to the use of sodium silicate although it is to be understood that it is not limited to the use of this material. The starting silicate solution may have an SiO$_2$:Na$_2$O weight ratio of from about 1:1 to 3.40:1.

The silicate solution is then sprayed as a fine mist into a drying chamber heated by suitable means, such as the combustion of propane. The mist is introduced into the top of the spray dryer, where it contacts a countercurrent flow of hot gases in its downward flight, and settles at the bottom as solid, dry, spheroidal particles of substantially uniform size and shape. Control of the particle size may be effected by controlling the characteristics of both the nozzle or spraying device and the silicate solution. For instance, the pressure applied in introducing the solution through the spray nozzle, its viscosity, temperature and composition will influence the particle size. Likewise, the type of nozzle or its specific construction also affects the particle size. The resulting particles are small and of sufficient hardness so that the rate of fall is of such gentle nature that very little fracture occurs when they reach the bottom of the dryer. Examination of the collected spray dried particles revealed that the shape was substantially spheroidal with less than 1% of the particles being irregularly shaped.

The dried particles are then treated with a suitable weakly acidic solution, such as 1–2% ammonium sulfate solution or a mineral acid such as sulfuric, hydrochloric, nitric acid, etc. The acidic material is added as a weak solution and in an amount sufficient to neutralize all the soda in the dried silicate particles and is of sufficient strength to keep the pH of the treated particles on the acid side. Acid treating the dried silicate particles converts the soda to sodium sulfate which is subsequently removed by washing.

As will be illustrated in the examples, the order in which soda neutralization is carried out has a significant influence on the ultimate surface area of the final product. For example, if the spray dried particles are first slurried in water prior to acid treatment, a high surface area, above about 200 m.$^2$/g. will result. On the other hand, if the dried particles are first treated with a neutralizing amount of acid, a surface area of less than 100 m.$^2$/g., and generally of the order of about 10 to 50 m.$^2$/g., will be obtained.

If the sodium silicate is treated with sufficient acid to neutralize the soda prior to spray drying, a product with a surface area of about 200 m.$^2$/g. will result.

In this process, the sodium silicate is treated with sufficient acid to neutralize the alkali in the silicate but not sufficient to form a gel. The neutralization is carried out with a solution of a strong mineral acid, such as hydrochloric, sulfuric, nitric, etc. The pH is adjusted to about 2.9 to 3.5 in this step. After the neutralization, the sol is spray dried and washed using the techniques described previously.

The invention is further illustrated by the following examples.

Example 1

A 6.0° Bé. sodium silicate solution having a 3.25:1 silica to soda weight ratio and at a temperature of 70° F. was passed as a fine mist through a spray nozzle into the top portion of a spray dryer. The dryer inlet temperature was 900° F. and the outlet temperature 300–350° F. The mist, upon contact with the heated atmosphere, solidified into spheroidal silicate particles and dropped into the bottom of the drying zone. Six pounds of the dried product were collected and acidified with 6 gallons of a 1.25% ammonium sulfate solution with vigorous agitation, filtered, then washed with 6 gallons of water, re-washed with 3 gallons of a .125% ammonium sulfate solution and again washed with 9 gallons of water. The thus washed silica particles were then finally dried and analyzed. The results of such analysis are as follows:

T.V. (total volatile matter) overall basis, percent ___ 5.42
$Na_2O$, dry basis, percent _____ 0.59
$SO_4$, dry basis, percent _____ 0.16

Particle size (corrected air elutriation):
    0–20 microns, percent _____ 65.7
    20–40 microns, percent _____ 29.7
    40–80 microns, percent _____ 3.6
    80+ microns, percent _____ 1.0
    Average particle size, microns _____ 16

Surface measurements at 1000° F.:
    Surface area, $m.^2/g.$ _____ 40
    Pore volume, $cm.^3/g.$ _____ 0.13
    Pore diameter, A. _____ 130

Example II

This example illustrates the effect of treating the spray dried silicate with water before neutralization of the soda with an acidic material is carried out. A sodium silicate solution was spray dried in the same manner as described in Example 1 except that in this case a 21.0° Bé. sodium silicate solution was used. The dried particles were divided into three portions, designated A, B and C, and each portion treated as follows:

*Portion A.*—6 pounds of dried particles were slowly added to a 1% sulfuric acid solution with vigorous agitation. The acid-treated particles were then filtered, washed first with 12 gallons of water, then with 6 gallons of a 2% ammonium sulfate solution and again with 18 gallons of water and finally re-dried.

*Portion B.*—To 6 pounds of dried particles there were slowly added 6 gallons of water with vigorous agitation. 2 pounds of 98% sulfuric acid were then added to the water-slurried particles, filtered, washed first with 12 gallons of water, then with 6 gallons of 2% ammonium sulfate solution, then with 18 gallons of water and finally re-dried.

*Portion C.*—In this case, the acid was slowly added with agitation to the silica instead of the silica addition to the acid as carried out in Portion A. Washing was carried out in the same order and the types and quantities of washing media were the same as described in Portion A.

The final products resulting from each of the above treatments gave the final analyses:

| | "A" | "B" | "C" |
|---|---|---|---|
| T.V., overall basis, percent | 5.72 | 4.72 | 8.06 |
| $Na_2O$, dry basis, percent | 0.08 | 1.12 | 0.14 |
| $SO_4$, dry basis, percent | 0.11 | 0.68 | 0.09 |
| Particle size (Corrected Air Elutriation): | | | |
|   0–20 microns, percent | 42.1 | 38.6 | 45.6 |
|   20–40 microns, percent | 30.3 | 22.7 | 29.4 |
|   40–80 microns, percent | 24.4 | 24.8 | 22.2 |
|   80+ microns, percent | 3.2 | 13.9 | 2.8 |
| Surface Measurements at 1,000° F.: | | | |
|   Surface area, $m.^2/g.$ | 21 | 256 | 12 |
|   Pore volume, $cm.^3/g.$ | .06 | .83 | .02 |
|   Pore diameter, A. | 114 | 130 | 67 |
|   Particle density, g./ml. | 2.02 | .79 | 2.20 |

It is apparent from the above that Portion B treatment gave a product having a much higher surface area than the products treated according to the methods of Portions A and C. It is also significant from the analyses of the products treated according to A and C that the order of adding the silicate particles to acid or vice versa had little or no influence on the surface area of the final product.

Example III

This example punctuates the effect on the surface area of the final product when the sodium silicate solution is first treated with acid to neutralize the soda and then spray drying the resulting neutralized mixture. It differs from the process of the invention covered in application Serial No. 832,890 which consists in first spray drying the silicate solution and thereafter neutralizing the soda in the dried particles.

A 6.7° Bé. sodium silicate solution was acidified with sulfuric acid to form a sol having a pH of 2.9. The resulting sol was aged for one day and then spray dried before it gelled. Four pounds of the dried particles were treated with 2 gallons of 5.5% sulfuric acid, then washed first with 4 gallons of water, then with 2 gallons of 2% ammonium sulfate solution, followed with a final wash with 6 gallons of water and finally re-dried.

The final product analyzed as follows:

T.V. overall basis, percent _____ 6.13
$Na_2O$, dry basis, percent _____ 0.023
$SO_4$, dry basis, percent _____ 0.32

Kellogg density, $lbs./ft.^3$:
    Loose _____ 27.1
    Freely settled _____ 34.5
    Compacted _____ 42.8

Surface measurements at 1000° F.:
    Surface area, $m.^2/g.$ _____ 229
    Pore volume, $cm.^3/g.$ _____ 0.20
    Pore diameter, A. _____ 35

Particle size:
    4–10 microns, percent _____ 30
    10–20 microns, percent _____ 45
    20–30 microns, percent _____ 25

It is noted that by first acidifying the silicate solution to form a sol and thereafter spray drying the sol, a final product is obtained having a relatively high surface area. Moreover, an examination of the final product showed that only 80% of the particles were of spheroidal shape while 20% appeared in the form of agglomerates.

Example IV

This example emphasizes the effect of agitation during acid treatment of the spray dried silicate particles and the influence of such action on the surface area of the final product. 6 pounds of the spray dried particles prepared according to Example I were treated with 3 gallons of 6% sulfuric acid without agitation. The slurry gelled and had to be broken up. It was then filtered, washed with 6 gallons of water, then with 2% sulfuric acid, rewashed with 9 gallons of water, and finally redried. The product analyzed as follows:

T.V., overall basis, percent _____ 6.03
$Na_2O$, dry basis, percent _____ 1.44
$SO_4$, dry basis, percent _____ 1.88

Particle size (corrected air elutriation):
    0–20 microns, percent _____ 62.8
    20–40 microns, percent _____ 26.1
    40–80 microns, percent _____ 8.9
    80+ microns, percent _____ 2.2

Surface measurements at 1000° F.:
    Surface area, $m.^2/g.$ _____ 250
    Pore volume, $cm.^3/g.$ _____ 0.98
    Pore diameter, A. _____ 157

These data indicate the absence of agitation during acid treatment of the dried particles prior to washing tends to localize the action of the acid by redissolving the dried particles and results in a higher surface area of the product.

What is claimed is:

1. A process for preparing a silica gel wherein about 80% of the particles have a particle size below 80 microns and a surface area of about 100 to 250 $m.^2/g.$ which comprises the steps of:
    (a) diluting a sodium silicate solution to about 6° Bé.,
    (b) adjusting the pH of the solution to about 2.9 to 3.5 with a mineral acid selected from the group consisting of hydrochloric, nitric and sulfuric acids,
    (c) aging the resulting sol, (d) spray drying said sol in a spray drier operated at an inlet temperature of about 900° F. and an outlet temperature of about 300° F.,
(e) washing the resulting particles with a solution of sulfuric acid in about a 6% concentration, followed by a water wash and a wash with a solution of ammonium sulfate in a concentration of about 2%,
(f) drying and recovering the product silica.

2. A process for preparing a silica gel wherein about 80% of the particles have a particle size below about 80 microns and a surface area of about 100 to 250 square meters per gram which comprises the steps of:
(a) diluting a sodium silicate solution to a concentration of about 6.7° Bé.,
(b) adjusting the pH of the solution to about 2.9 with a strong mineral acid selected from the group consisting of hydrochloric, nitric and sulfuric acids,
(c) aging the resulting sol at ambient temperature for about 24 hours,
(d) spray drying said sol in a spray drier operated at an inlet temperature of about 900° F. and an outlet temperature of about 300° F.,
(e) washing the resulting particles with a solution of sulfuric acid in a concentration of about 6%, followed by a water wash and a wash with a solution of ammonium sulfate in a concentration of about 2%,
(f) drying and recovering the product silica.

References Cited by the Examiner

UNITED STATES PATENTS

| | | | |
|---|---|---|---|
| 1,748,315 | 2/30 | Stoewener | 23—182 |
| 1,843,576 | 2/32 | McClure et al. | 23—182 |
| 1,900,859 | 3/33 | Connolly et al. | 23—182 |
| 2,699,376 | 1/55 | Hay | 23—182 |
| 2,871,099 | 1/59 | Ziese | 23—182 |
| 3,041,140 | 6/62 | Alexander | 23—182 |
| 3,070,426 | 12/62 | Winyall | 23—182 |

MAURICE A. BRINDISI, *Primary Examiner.*